(12) United States Patent
Koike

(10) Patent No.: US 7,712,786 B2
(45) Date of Patent: May 11, 2010

(54) MOTORCYCLE FUEL TANK

(75) Inventor: Munetaka Koike, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 219 days.

(21) Appl. No.: 11/944,085

(22) Filed: Nov. 21, 2007

(65) Prior Publication Data

US 2008/0121453 A1    May 29, 2008

(30) Foreign Application Priority Data

Nov. 24, 2006   (JP) .............................. 2006-316686
Apr. 5, 2007    (JP) .............................. 2007-099436

(51) Int. Cl.
*B60P 3/22*    (2006.01)
(52) U.S. Cl. ..................................................... 280/835
(58) Field of Classification Search ................ 280/833, 280/834, 835; 220/731, 734
See application file for complete search history.

(56) References Cited

U.S. PATENT DOCUMENTS

| | | | | | |
|---|---|---|---|---|---|
| 3,400,854 | A | * | 9/1968 | Conaway et al. | ............. 220/734 |
| 6,253,790 | B1 | * | 7/2001 | Hara | ...................... 137/565.17 |
| 7,484,766 | B2 | * | 2/2009 | Iwasaki | ...................... 280/833 |

FOREIGN PATENT DOCUMENTS

FR    2697423 A1 *  5/1994
JP    08-207860       8/1996

* cited by examiner

*Primary Examiner*—Kevin Hurley
(74) *Attorney, Agent, or Firm*—Keating & Bennett, LLP

(57) ABSTRACT

A motorcycle that securely prevents adhesion of fuel to an external surface of a fuel tank as it is bounced back in the course of refueling, and avoids interference with parts positioned below the fuel tank. The fuel tank has a filler opening formed in its transversal center with an upward opening. A projecting part projecting toward the filler opening is provided on a bottom wall of the fuel tank opposite to the filler opening.

16 Claims, 10 Drawing Sheets

MOTORCYCLE FUEL TANK

RELATED APPLICATIONS

This application claims the benefit of priority under 35 USC 119 of Japanese patent application no. 2006-316686, filed on Nov. 24, 2006, and Japanese patent application no. 2007-099436, filed on Apr. 5, 2007, which applications are hereby incorporated by reference in their entireties.

BACKGROUND OF THE INVENTION

1. Field of the Invention

This invention relates to a motorcycle having a fuel tank formed with a filler opening facing upward.

2. Description of Related Art

Conventionally, a fuel tank on a motorcycle has a filler opening at its upper end facing upward. Fuel is poured into the tank through the filler opening by inserting a filling tube of the fueling gun or of the portable fuel tank into the filler opening. While pouring, a refueling person checks the fuel level within the fuel tank through a gap between the filler opening and the filling tube to determine if the desired fuel level has been reached or not.

In recent years, some motorcycles have been provided with an air cleaner below the fuel tank. The fuel tank in this type of motorcycle has a relatively shallow depth in the area above the air cleaner. The filler opening is often formed in this area of shallow depth, and sometimes in the course of refueling, part of the fuel bounces back after hitting the bottom face of the tank and turns into fine particles that are spattered out of the fuel tank through the filler opening.

Fuel that is spattered out of the fuel tank adheres to and contaminates the outer surface of the fuel tank. Therefore, in fuel tanks having a shallow depth below the filler opening, fuel bouncing back in the course of refueling adheres to the external surface of the fuel tank and creates a problem in that the adhered fuel must be wiped off each time.

JP-B-3214654 discloses a fuel tank configuration to prevent fuel from bouncing back. In JP-B-3214654, a guide groove is formed on the bottom wall of the fuel tank opposite to the filling opening, for leading the fuel slantingly downward to the rear. The guide groove is formed in such shape that part of the bottom wall of the tank is downwardly swelling out, and is constituted with a concave groove having a cross section of circular arc. The inner surface of the guide groove is formed into a concave curve.

However, even when such a guide groove is formed on the bottom wall of the fuel tank, fuel hitting the wall of the guide groove constituted with a concave curve may still bounce back upward and spatter out of the filling opening. The amount of fuel spattering out of the tank may be reduced by forming the filler opening with a smaller bore. Such design, however, hinders the visual check of the fuel level in the course of refueling.

In addition, the fuel tank of JP-B-3214654 leads to the problem of reduced air cleaner capacity, because the upper wall of the air cleaner, located below the fuel tank, is concaved to avoid interference with the bottom wall of the fuel tank opposite to the filler opening, which is projected downward by the depth of the guide groove.

SUMMARY OF THE INVENTION

The present invention has been made to deal with such problems, and provides a motorcycle that securely prevents adhesion of fuel to the external surface of the fuel tank as it is bounced back in the course of refueling, and at the same time avoids interference with parts positioned below the fuel tank.

A motorcycle according to one embodiment of the present invention has a fuel tank with a filler opening formed in a transversal center of the fuel tank with an upward opening. A projecting part projecting toward the filler opening is provided on a bottom wall of the fuel tank opposite to the filler opening.

According to the present invention, the fuel hits the projecting part in the course of refueling. After hitting the projecting part, the fuel bounces back in radiating directions around the projecting part and is prevented from bouncing back toward the filler opening. In addition, since the bottom wall of the fuel tank is not projected downward, it does not interfere with parts located below the fuel tank such as the air cleaner. Thus, the present invention provides a motorcycle that securely prevents bounce back and adhesion of fuel to the external surface of the fuel tank during refueling, while also avoiding interference with parts below the fuel tank.

In one embodiment, the projecting part includes inclined planes formed between its projection tip and the bottom wall. Fuel hitting the projecting part while refueling is thereby directed to flow in directions in which the inclined planes extend and is prevented from bouncing back toward the filler opening.

In one embodiment, an inclined plane descends toward a left side and an inclined plane descends toward a right side of the motorcycle. In another embodiment, an inclined plane faces the rear of the motorcycle. In another embodiment, the projecting part is formed in the shape of a triangular pyramid. Thus, fuel hitting the projecting part may bounce back in directions including right, left and rearward, or may bounce back in three directions. The projecting part can thereby be compact in size and the capacity of the fuel tank increased.

Another embodiment of the invention includes an air cleaner having a top face inclined downward toward the rear of the motorcycle. The filler opening is disposed above the air cleaner, and the bottom wall of the fuel tank is downwardly inclined toward the rear along the top face of the air cleaner. Fuel is thereby more securely restrained from spattering out of the fuel tank since fuel directly hitting the bottom wall of the fuel tank without hitting the projecting part bounces back rearward. In addition, since the bottom wall of the fuel tank is formed generally along the top face of the air cleaner, the bottom wall can be disposed at the lowest level possible while avoiding the interference with the air cleaner. Thus, the distance between the filler opening and the bottom wall of the fuel tank is increased, which, along with downward inclination of the bottom wall of the fuel tank toward the rear, restrains spattering of fuel out of the filler opening even more securely.

In another embodiment, the fuel tank is disposed between right and left frame members of a body frame, and the projecting part is provided in the transversal center between the frame members. Accordingly, the filler opening and projecting part can be positioned in the transversal center of the vehicle body, and, the largest possible capacity of the fuel tank can be secured while avoiding interference with the operator's legs.

In another embodiment, the projecting part opens downward. An air cleaner is disposed below the fuel tank and includes an air cleaner element mounted by a mounting member to an air cleaner box. A head of the mounting member faces the inside of the opening of the projecting part. Thus, the mounting member effectively utilizes the wasted area created beneath the projecting part, and allows the largest possible capacity of the fuel tank and air cleaner to be secured.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
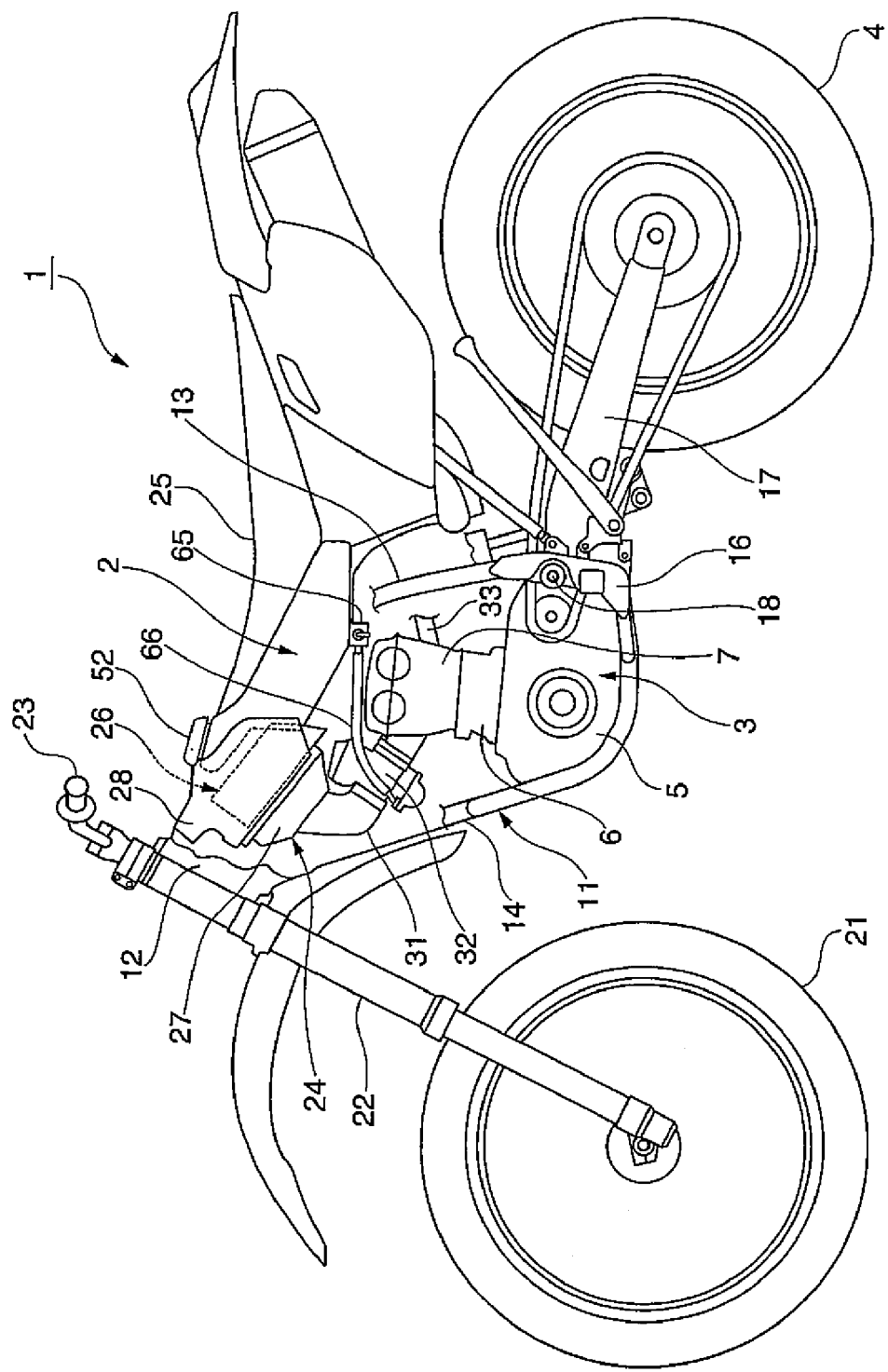
FIG. 1 is a side view of a motorcycle according to an embodiment of the invention.
Figure 2:
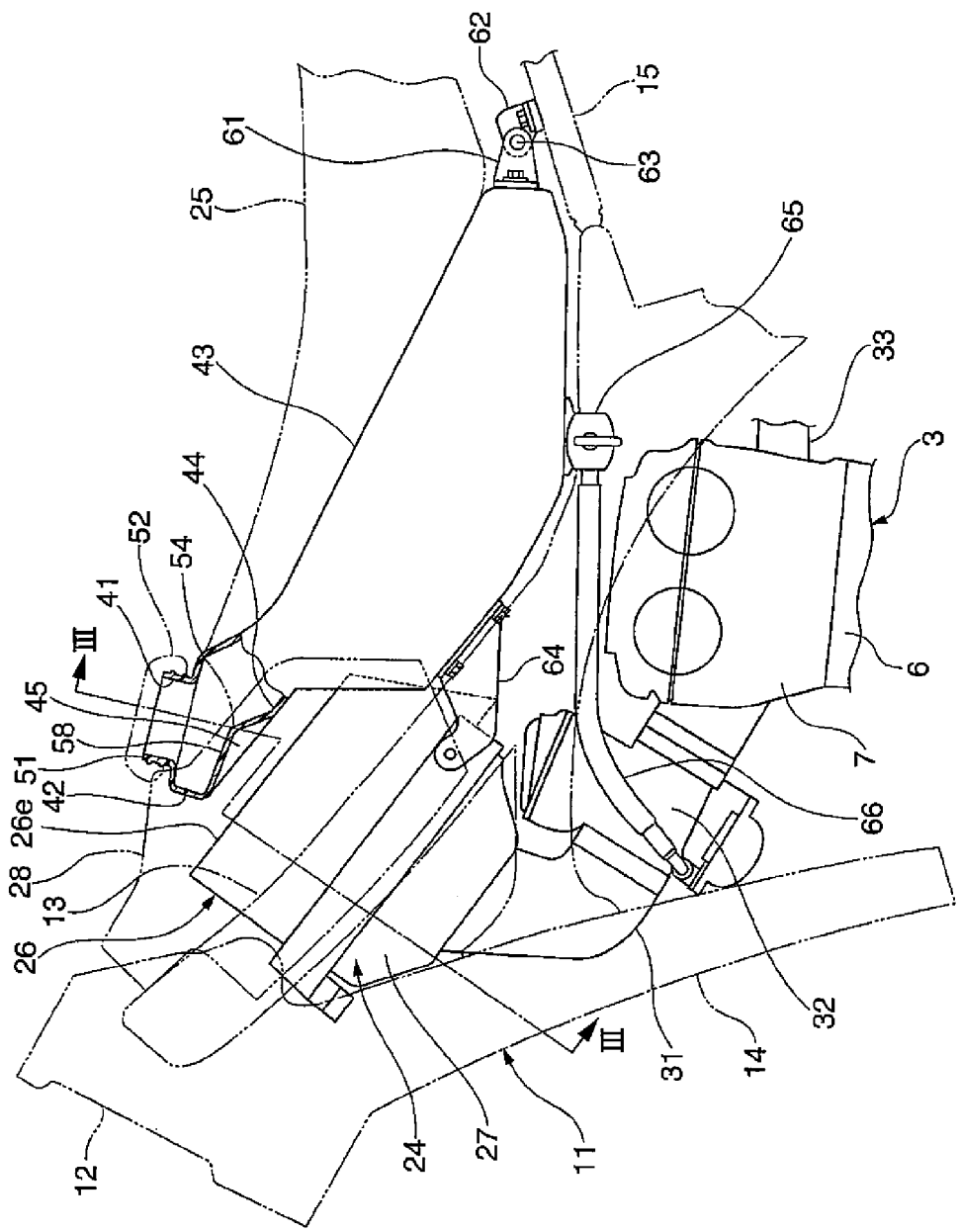
FIG. 2 is a side view of a fuel tank of the motorcycle.
Figure 3:
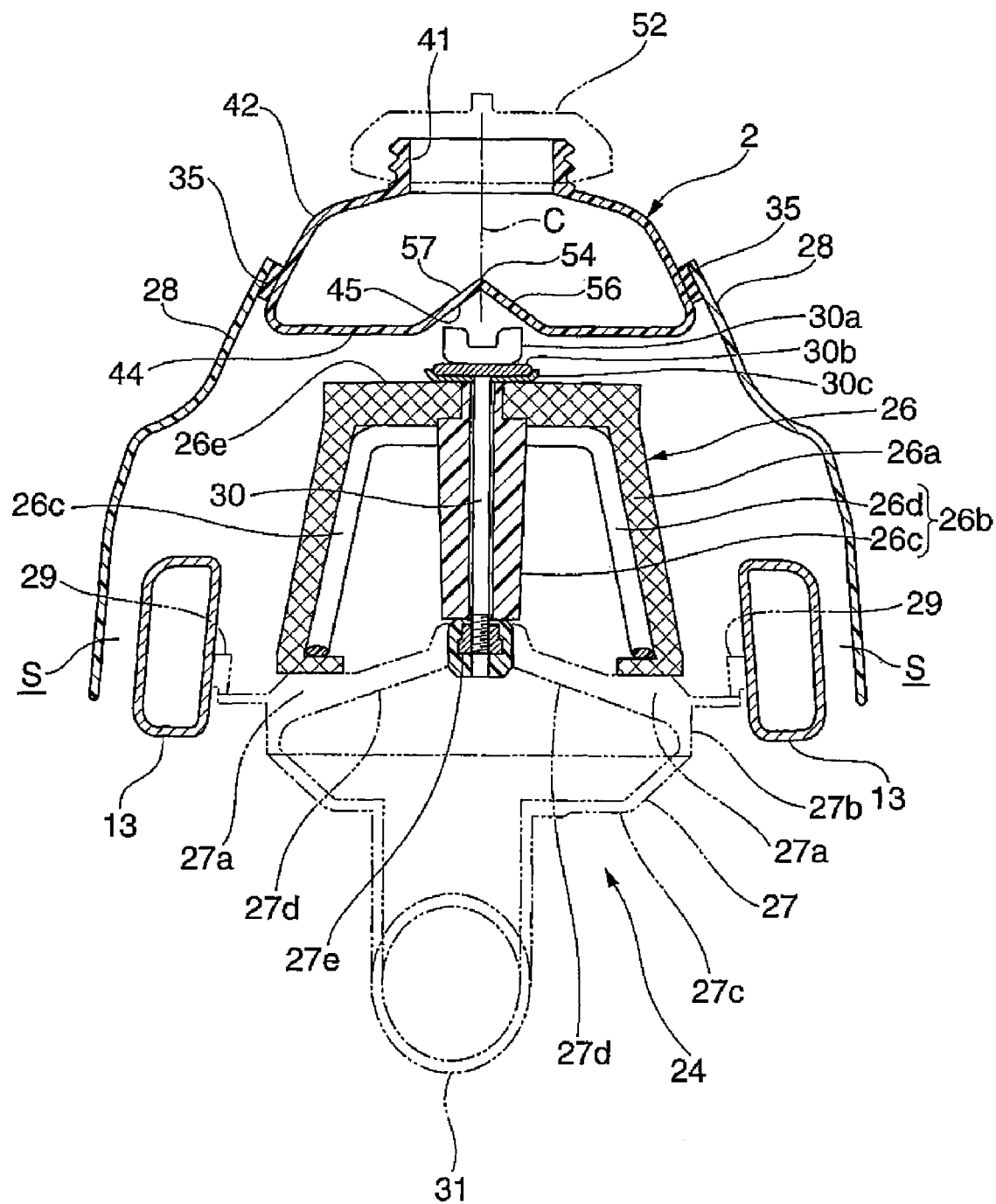
FIG. 3 is a cross-sectional view of a fuel tank and an air cleaner of the motorcycle.
Figure 4:
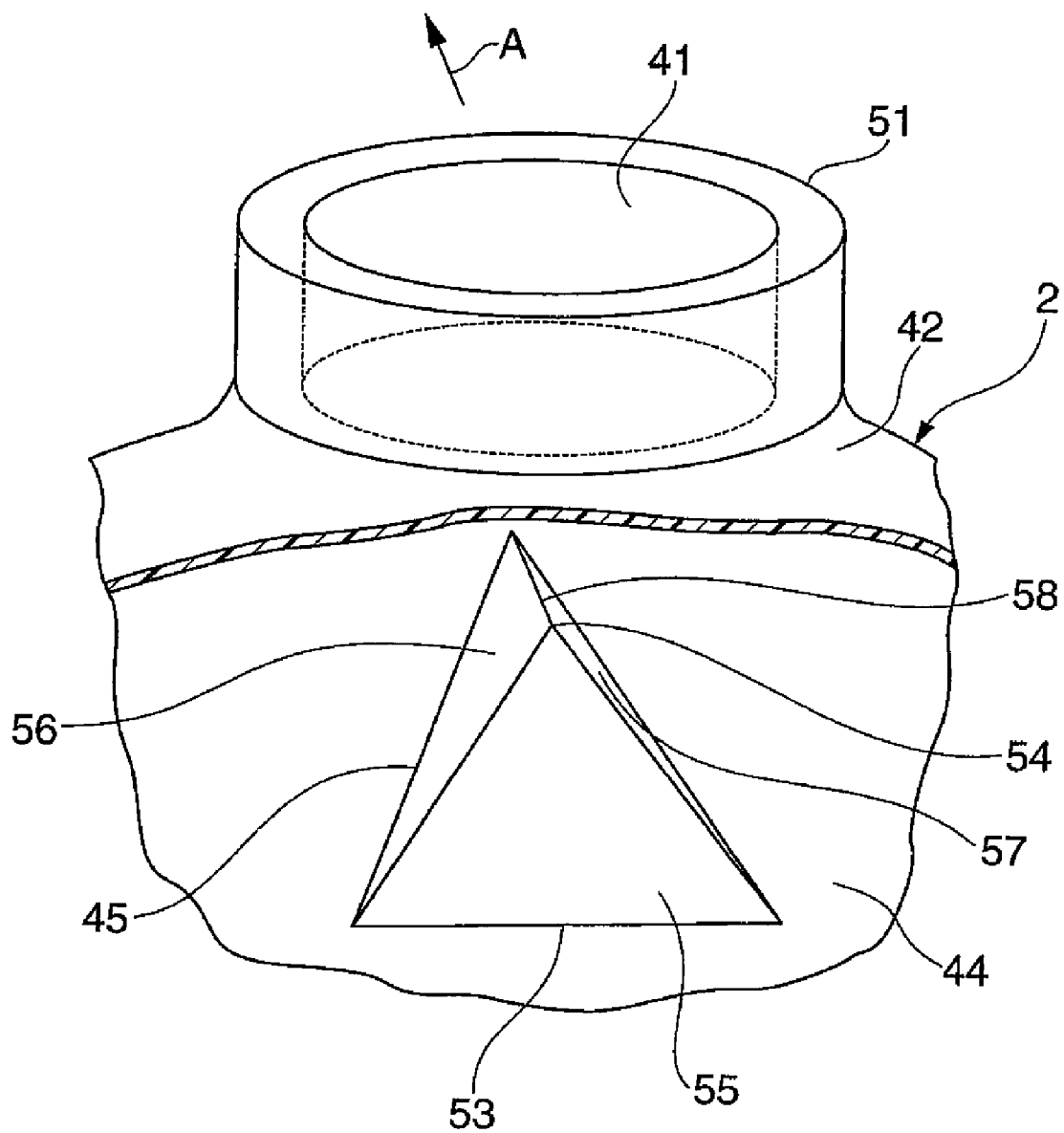
FIG. 4 is a perspective view of a projecting part of the fuel tank.

An embodiment of a motorcycle according to the present invention is now described with reference to FIGS. 1-4. FIG. 1 is a side view of a motorcycle 1, in which part of a body frame is omitted. FIG. 2 is a side view of a fuel tank of motorcycle 1. FIG. 3 is a sectional view of the fuel tank and an air cleaner, taken along line III-III of FIG. 2. FIG. 4 is a perspective view of a projecting part of the fuel tank.

Motorcycle 1 is equipped with a fuel tank 2. Motorcycle 1 runs by turning a rear wheel 4 driven by an engine 3. Engine 3 is a four-stroke engine installed on body frame 11 with its crank case 5, cylinder body 6, and cylinder head 7 being disposed vertically on top of each other. In one embodiment, motorcycle 1 is a motocross type motorcycle.

Body frame 11 is a so-called a cradle type structured by a pair of right and left main pipes 13 extending downward from a head pipe 12 to the rear, seat rails 15 extending rearward from the mid point of main pipes 13, rear arm brackets 16 connected to the rear end of main pipes 13 and to the lower end of a down tube 14. Main pipe 13 defines a frame member, as is referred to in the present invention.

A front fork 22 supporting a front wheel 21 for rotation and a steering handle 23 are rotationally attached to head pipe 12. An air cleaner 24 is attached to head pipe 12 and main pipes 13. Fuel tank 2 is attached to main pipes 13 and seat rails 15. A seat 25 is mounted on top of fuel tank 2 and seat rails 15. Rear arms 17, rotationally supporting rear wheel 4, are attached to rear arm bracket 16 in a vertically swingable manner.

As shown in FIGS. 2 and 3, air cleaner 24 comprises an air cleaner element 26 and an air cleaner box 27 for supporting air cleaner element 26. Air cleaner element 26 and the upper part of air cleaner box 27 are covered with an air cleaner cover 28 constituting an external part of the vehicle body.

Air cleaner element 26 comprises an element body 26a formed into a closed-end cylinder with the other end opening downward, and a supporting frame 26b provided on the inside of element body 26a. Supporting frame 26b comprises a supporting rod 26c and plural supporting arms 26d radially extending from the upper end section of supporting rod 26c. The upper end section of supporting rod 26c has a relatively smaller diameter above the connecting position of supporting arms 26d, and at the same time penetrates element body 26a in a vertical direction.

As shown in FIG. 3, air cleaner box 27 comprises a frame body 27b having a mounting seat 27a to which the bottom end of air cleaner element 26 is entirely pressed, and a box main body 27c covering frame body 27b from below. Frame body 27b has integrally formed plural supporting arms 27d extending toward the internal area. A nut 27e is formed in supporting arms 27d by means of insert molding so that it is positioned in the center of frame body 27b.

A wing bolt 30 is tightened into nut 27e to fasten air cleaner element 26 to air cleaner box 27. Wing bolt 30 defines the mounting member as is referred to in the present invention. Wing bolt 30 penetrates supporting rod 26c as it is tightened to nut 27e. Washers 30b, 30c are provided between a head 30a of wing bolt 30 and element body 26a. Head 30a of wing bolt 30 faces the back side of a projecting part 45 in fuel tank 2.

Air cleaner box 27 is located between left and right main pipes 13, and as shown in FIG. 2, is mounted to body frame 11 so that a top face 26e of air cleaner element 26 slants downward to the rear. Top face 26e of air cleaner element 26 defines the top face of the air cleaner as is referred to in the present invention.

As shown in FIG. 3, both ends of air cleaner box 27 in the transverse direction of the vehicle body are connected to internal side faces of main pipes 13 when viewed in a transverse direction via sealing members 29 inserted in between. An intake pipe 31 is mounted to the bottom of box main body 27c of air cleaner box 27.

As shown in FIG. 2, intake pipe 31 extends rearward from air cleaner box 27 in a descending manner, connecting a carburetor 32 mounted in front of cylinder head 7 to air cleaner box 27. An exhaust pipe 33 is connected to the rear of cylinder head 7.

As shown in FIG. 3, air cleaner cover 28 covers the upper part of air cleaner box 27 and air cleaner element 26, including part of main pipes 13 and the front part of fuel tank 2. Air cleaner cover 28 may have a U-shape lying on its side in top plan view, opening to the rear of the vehicle body. Air cleaner cover 28 is mounted to body frame 11 so that the front end of fuel tank 2 faces the opening area of air cleaner cover 28.

A sealing member 35 is interposed between air cleaner cover 28 and fuel tank 2 for preventing suction of fresh air and/or entrance of rainwater from above. A gap S is formed between air cleaner cover 28 and main pipes 13 to provide intake air passage.

Fuel tank 2 is made of plastic material molded into a predetermined shape, and is located in the highest position at the front end part of the vehicle body, with its upper extending part 42 having a filler opening 41 and its main reservoir part 43 connected to the rear end of upper extending part 42 being formed in an integrated manner.

Extending part 42 extends transversely and in the fore-and-aft direction of the vehicle body above air cleaner element 26. A bottom wall 44 of extending part 42 is integrally formed with projecting part 45, and inclines downward toward the rear along top face 26e of air cleaner element 26 when viewed from the side of the vehicle body. Bottom wall 44 and top face 26e of air cleaner element 26 oppose each other at a predetermined distance. Bottom wall 44 of upper extending part 42 defines a bottom wall of the fuel tank as is referred to in the present invention.

Filler opening 41 has its opening on upper extending part 42 and comprises a cylindrical threaded portion 51 constituting an upper end of upper extending part 42. Cylindrical threaded portion 51 is positioned in the transversal center of upper extending part 42 and above air cleaner element 26, and is formed slantingly so that its axial line points to the upper rear. Upper extending part 42 is positioned in the transversal center of fuel tank 2, and fuel tank 2 is positioned in the transversal center of the distance between left and right main pipes 13.

The opening diameter of cylindrical threaded portion 51 (bore diameter of filler opening 41) is determined such that when a filling tube of a fuelling gun is inserted, a predetermined gap is formed between the filling tube and an inner peripheral surface of cylindrical threaded portion 51. The predetermined gap needs at least a sectional area such that a person filling the fuel tank can visually check the fuel level within fuel tank 2. By forming cylindrical threaded portion 51 on upper extending part 42, filler opening 41 has an upward opening. A fuel cap 52 is screwed into cylindrical threaded portion 51.

As shown in FIGS. 2-4, projecting part 45 is formed by projecting bottom wall 44 toward filler opening 41 in the opposite part to filler opening 41. Projecting part 45 may take the shape of a triangular pyramid, as shown in FIG. 4. FIG. 4 is a cutaway view directly in the rear of cylindrical threaded portion 51 of fuel tank 2, looking at the inside of fuel tank 2 from an upper rear position. Arrow (A) in FIG. 4 points to the front of motorcycle 1. Note that the male threads on cylindrical threaded portion 51 are omitted in FIG. 4.

The triangular pyramid that defines projecting part 45 has a bottom face of isosceles triangle shape with one side 53 of the bottom face extending in a transverse direction of the vehicle body. As shown in FIGS. 2 and 3, projecting tip 54 of the triangular pyramid is positioned on hypothetical straight line "C" obtained by downwardly extending the axial line of cylindrical threaded portion 51 (In FIG. 2, line "C" overlaps line III-III that shows the cut-away position for FIG. 3).

In projecting part 45 having the triangular pyramid structure, three slanting surfaces are formed as shown in FIG. 4, including a rear inclined plane 55 extending rearward in a descending manner from projection tip 54 to one side 53 of the bottom face, a left inclined plane 56 and a right inclined plane 57. Left inclined plane 56 points to the upper left front of the vehicle body, while right inclined plane 57 points to the upper right front of the vehicle body. Edge 58, consisting of the ridge line formed by left inclined plane 56 and right inclined plane 57, extends in the fore-and-aft direction, and is inclined downward toward the rear when viewed from the side of the vehicle body, as shown in FIG. 2.

Main reservoir part 43 of fuel tank 2 extends rearward in a descending manner from the rear end of upper extending part 42. The front end of main reservoir part 43 has a U-shape lying on its side in a top plan view, opening to the front of the vehicle body. Fuel tank 2 is attached to body frame 11 so that the rear end of air cleaner element 26 faces the inner surface of the recess formed in the front end of main reservoir part 43.

A rear bracket 61 is mounted at the rear end of main reservoir part 43 allows body frame 11 to support the rear part of fuel tank 2. Rear bracket 61 is mounted in the transversal center of main reservoir part 43 projecting to the rear. The rear end of rear bracket 61 is fastened to a mounting member 62 by a mounting bolt 63.

Both transversal ends of main reservoir part 43 are formed above main pipes 13 to face them from the inner part of the vehicle body. The lower end lines on both such transversal ends are formed to run along the upper face of main pipes 13 when viewed from the sides of the vehicle body.

Front brackets 64 are mounted at the lower end in the front part of, and at the same time on both transversal ends of main reservoir part 43 to allow body frame 11 to support the front part of fuel tank 2. Front brackets 64 make a pair at transversely symmetric positions, and project forward from main reservoir part 43. The front end of front brackets 64 is fastened to the inward side surface of main pipe 13 by a mounting bolt.

A so-called "gravitationally dropping" fuel cock 65 is mounted on the left side lower end of main reservoir part 43. Fuel contained in fuel tank 2 is delivered to carburetor 32 from fuel cock 65 by way of a fuel hose 66.

To fill fuel tank 2, a filling tube of a fuelling gun or a portable fuel tank is inserted into filler opening 41 to pour fuel into upper extending part 42. The person filling the fuel tank controls the filling amount by visually checking the fuel level within fuel tank 2 through a gap between filler opening 41 and the filling tube. To top off fuel tank 2, for instance, the refueling person can stop filling the fuel as the fuel level reaches projecting part 45 of upper extending part 42.

While refueling, fuel poured into upper extending part 42 through the filling tube hits projecting part 45. The direction of flow of the fuel is altered by projecting part 45 and bottom wall 44 to run toward the periphery of projection part 45. Fuel hitting projecting part 45 bounces back in such direction that the slanting surfaces of projecting part 45 (inclined planes 55-57) are extending when looking at projecting part 45 from filler opening 41, in other words, the radiating directions to the right and left and to the fore and aft, centered on projecting part 45.

Consequently, fuel does not bounce back toward filler opening 41 after hitting projecting part 45, thus, fuel is not spattered out of fuel tank 2 through filler opening 41, and the outer surface of fuel tank 2 is not contaminated by fuel adhered to it. And, since projecting part 45 is formed by projecting bottom wall 44 upwardly, there is no need to alter the shape of air cleaner element 26 to avoid interference with bottom wall 44. Thus, the air cleaner can be provided with a larger capacity.

Filler opening 41 is positioned above air cleaner element 26 in which top face 26e is inclined downward toward the rear, and bottom wall 44 of upper extending part 42 opposite to filler opening 41 is inclined downward toward the rear along top face 26e when viewed from the side of the vehicle body.

Consequently, fuel flow directly hitting bottom wall 44 without hitting projecting part 45 bounces back rearward, since bottom wall 44 is inclined downward toward the rear. Thus, fuel bouncing back within fuel tank 2 while refueling is restrained more securely from being scattered out of fuel tank 2 from filler opening 41.

In addition, since bottom wall 44 is formed generally along top face 26e of air cleaner element 26, bottom wall 44 can be disposed at the lowest level possible while avoiding interference with air cleaner element 26. Thus, the distance between filler opening 41 and bottom wall 44 can be increased, which, along with the downward inclination of bottom wall 44 toward the rear, restrains fuel from being scattered out from filler opening 41 even more securely.

Because projecting part 45 of FIG. 4 is formed as a triangular pyramid, fuel that hits projecting part 45 bounces back in three directions toward the periphery of projecting part 45. Thus, projecting part 45 prevents fuel from bouncing back toward filler opening 41 and can be formed in compact size. The capacity of fuel tank 2 can thereby be increased since projecting part 45 can be made in smaller dimensions.

Figure 5:
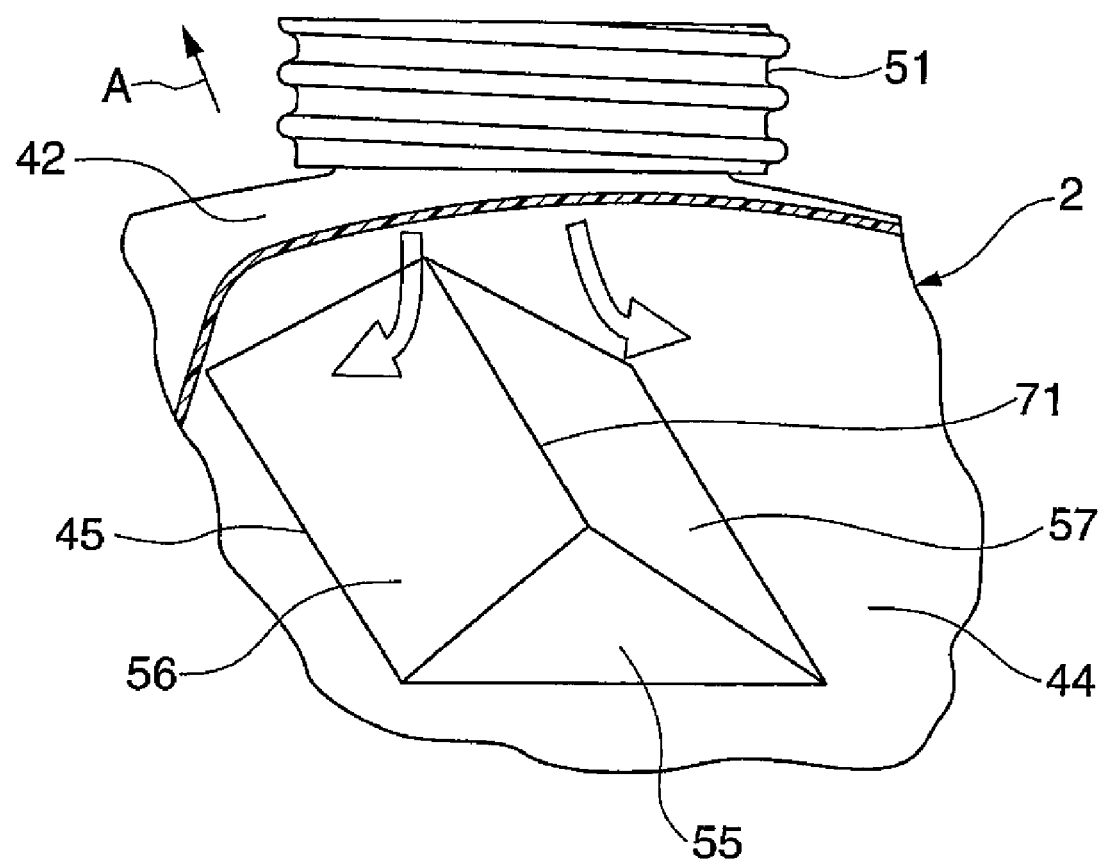
FIG. 5 is a perspective view of an embodiment of the projecting part formed in a roof shape.
Figure 6:
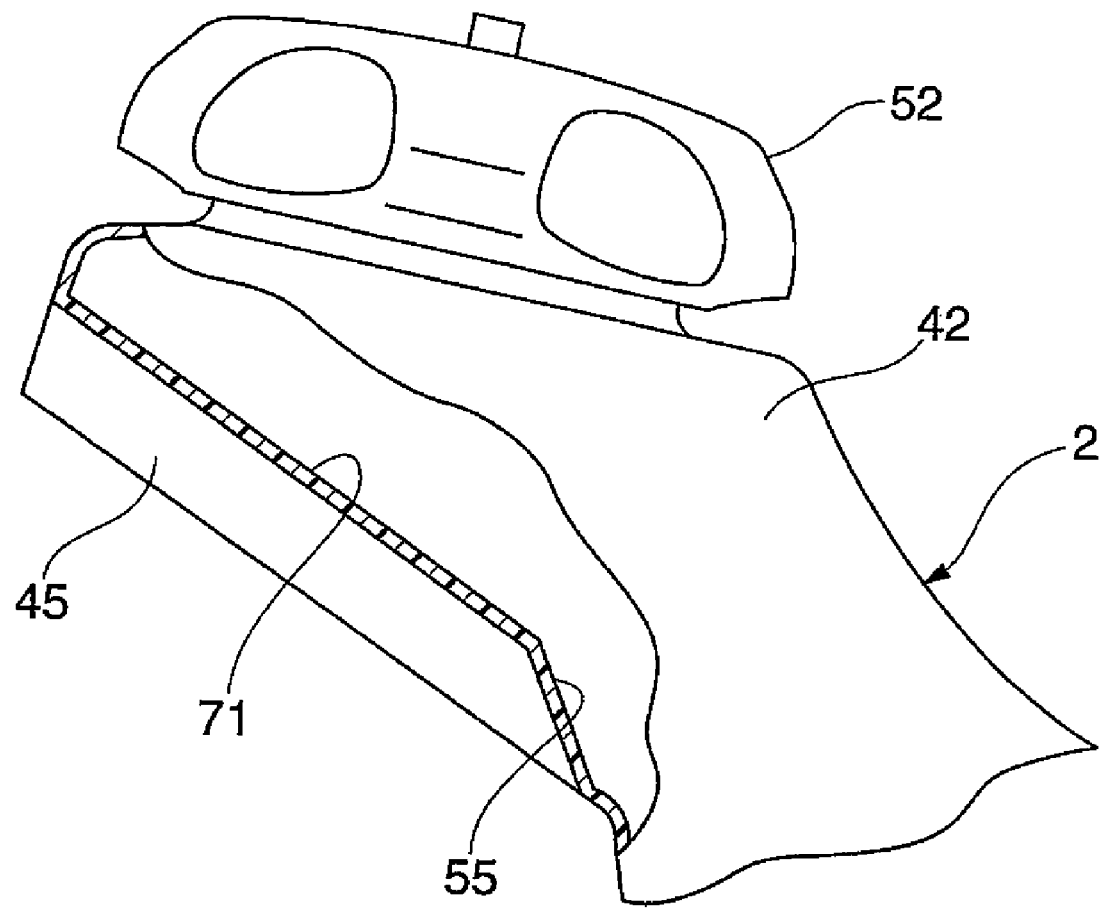
FIG. 6 is a vertical sectional view of the projecting part taking a roof shape.
Figure 7:
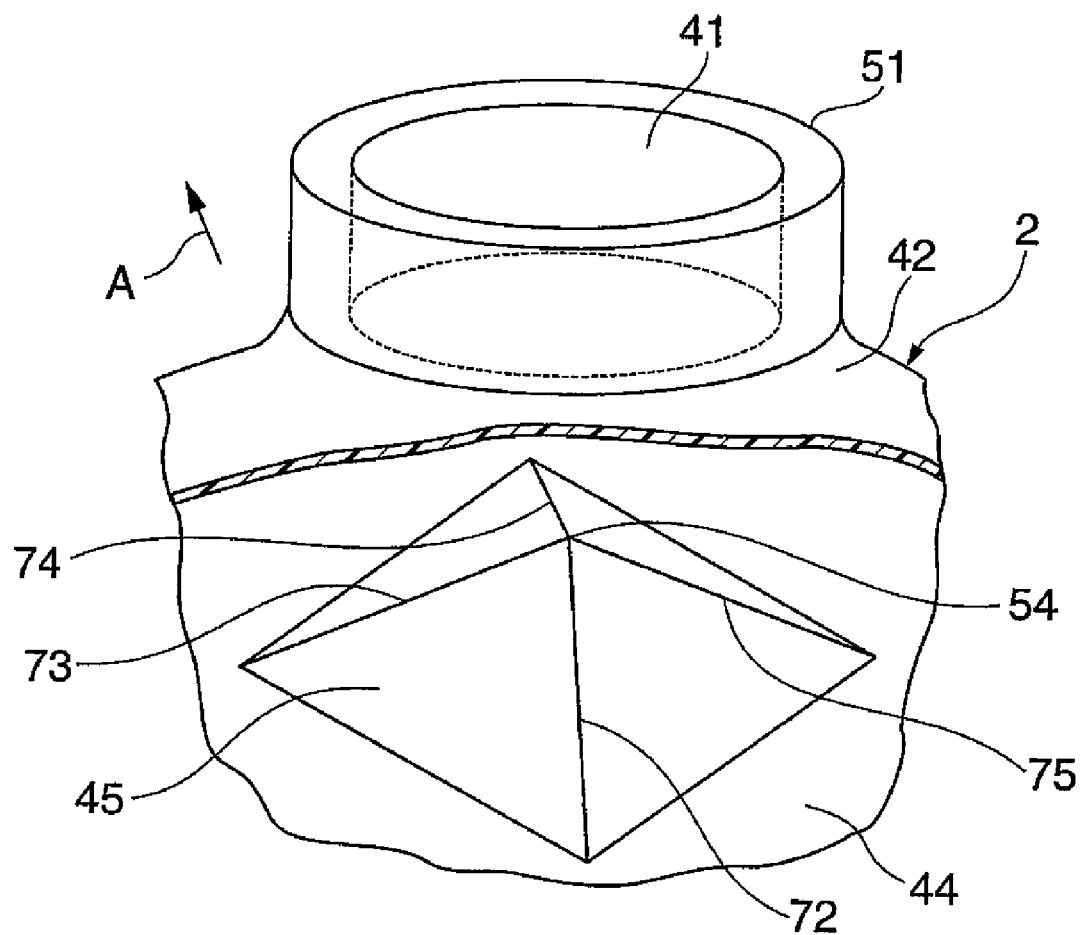
FIG. 7 is a perspective view of an embodiment of the projecting part formed as a tetragonal pyramid.
Figure 8:
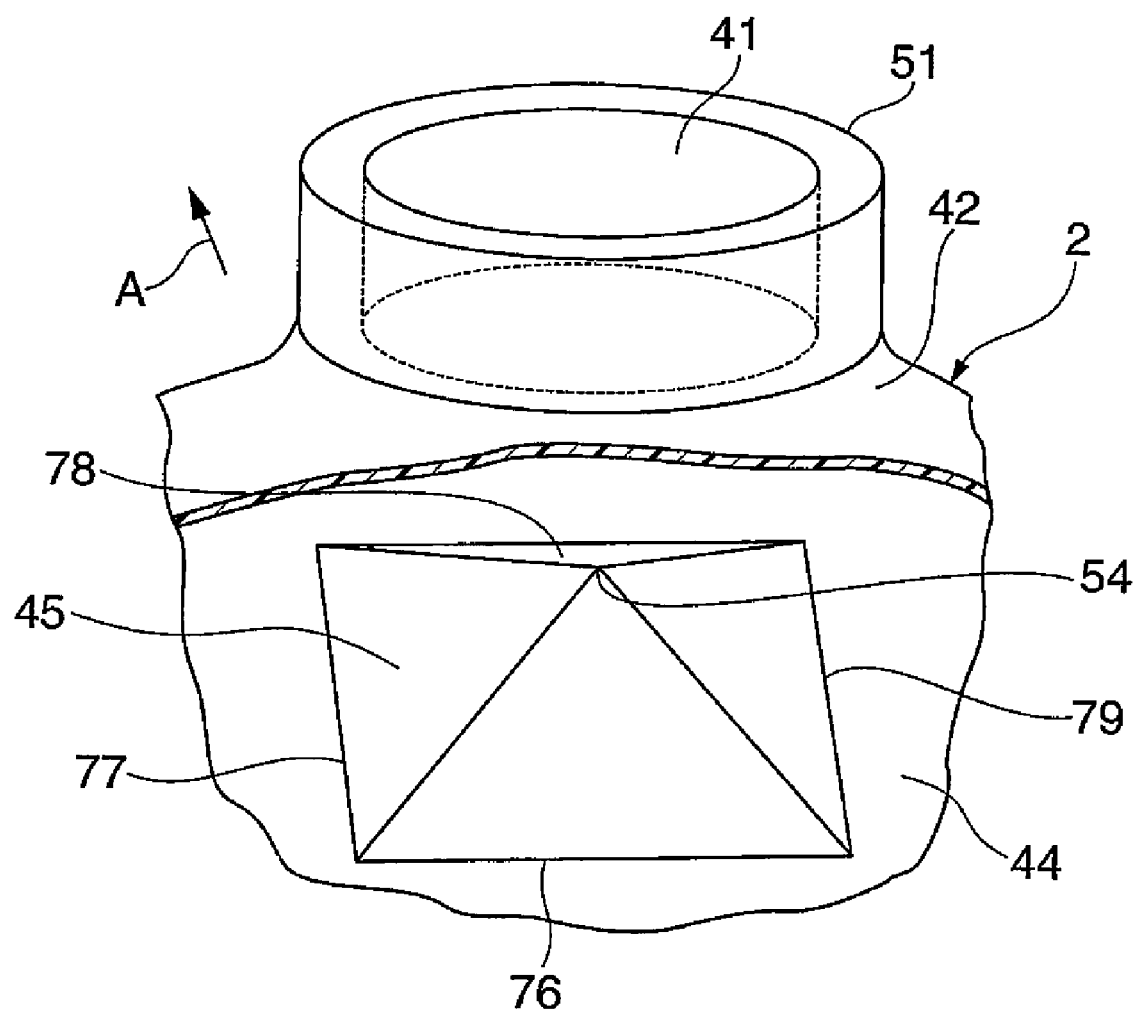
FIG. 8 is a perspective view of an embodiment of the projecting part formed as a tetragonal pyramid.
Figure 9:
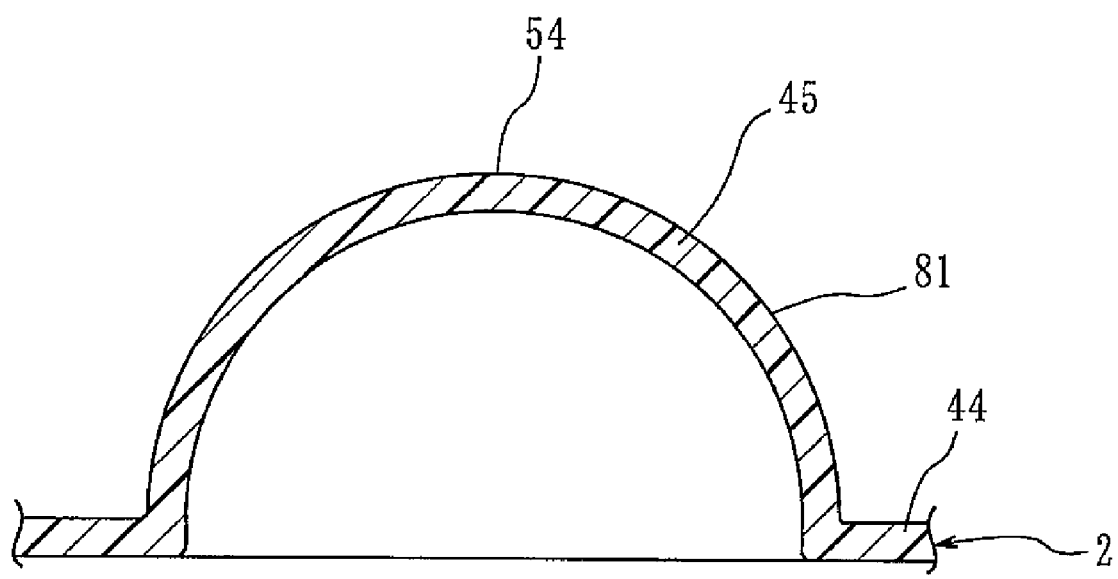
FIG. 9 is a sectional view of an embodiment of the projecting part formed as a hemisphere.

As shown in FIGS. 5-9, projecting part 45 may take alternate shapes such as a roof, a tetragonal pyramid or a hemisphere. FIGS. 5 and 6 show an embodiment in which projecting part 45 is formed in the shape of a roof. FIGS. 7 and 8 show an embodiment in which projecting part 45 is formed in the shape of a tetragonal pyramid. FIG. 9 shows an embodiment in which projecting part 45 is formed in the shape of hemisphere. In FIGS. 5-9, features identical with or equivalent to those described in FIGS. 1-4 are designated by the same reference characters, and repeat description of such features is omitted where appropriate.

Projecting part 45 of FIGS. 5 and 6 has a so-called "gable roof" shape including a left side inclined plane 56 and a right side inclined plane 57. Left side inclined plane 56 points to the upper left part of the vehicle body, while right side inclined plane 57 points to the upper right part of the vehicle body.

Ridge line 71, formed by left inclined plane 56 and right inclined plane 57, extends in the fore-and-aft direction of the vehicle body in the top plan view, and is inclined downward toward the rear when viewed from the side of the vehicle body as shown in FIG. 6. Ridge line 71 crosses an extension line given by downwardly extending the axial line of cylindrical threaded portion 51. A rear inclined plane 55 extending rearward in a descending manner is formed in the rear end of projecting part 45 taking the shape of a roof.

Projecting part 45 of FIGS. 7 and 8 is formed in the shape of a tetragonal pyramid. Four edges 72-75 extending from projecting tip 54 of the tetragonal pyramid to corners of the bottom face extends in the transverse direction and in the fore-and-aft direction of the vehicle body. As shown in FIG. 8, four sides 76-79 enclosing the bottom face of the tetragonal pyramid extend in the transverse direction and in the fore-and-aft direction of the vehicle body.

Projection tip 54 of FIG. 7 defining the apex of projecting part 45, and projection tip 54 of FIG. 8 defining the projection tip of projecting part 45, are positioned on an extension line given by downwardly extending the axial line of cylindrical threaded portion 51.

Projecting part 45 of FIG. 9 is formed in the shape of hemisphere making an upward convex curve. Thus, projection tip 54 of projecting part 45 is formed by part of the convex curve surface. An inclined plane 81 constituted with a spherical surface is formed in projecting part 45.

Projecting parts 45 of FIGS. 5-9 have the same effect as the embodiment of FIGS. 1-4. It should be emphasized that projecting part 45 is not limited to the shapes shown and described herein, but be of any shape having at least a pair of inclined planes or surfaces.

Figure 10:
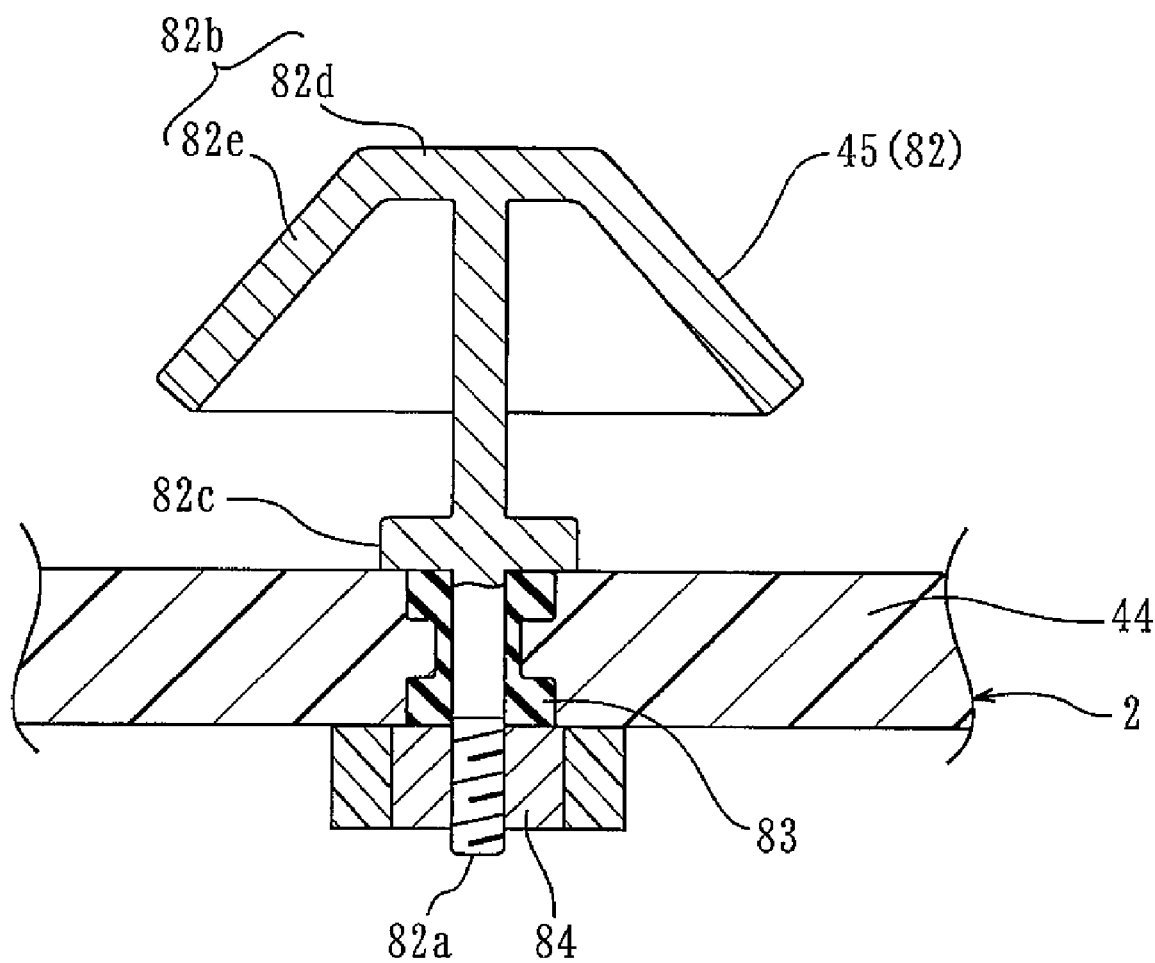
FIG. 10 is a sectional view of an embodiment of the projecting part formed separately from the fuel tank.

FIGS. 1-9 show examples in which projecting part 45 is integrally formed with bottom wall 44 of fuel tank 2. However, projecting part 45 can be formed separately from bottom wall 44, as shown in FIG. 10. In FIG. 10, features identical with or equivalent to those described in FIGS. 1-9 are designated by identical reference characters, and repeat description of such features is omitted where appropriate.

Projecting part 45 of FIG. 10 comprises an umbrella member 82 formed separately from bottom wall 44 of fuel tank 2. Umbrella member 82 includes a bolt 82a penetrating bottom wall 44, an umbrella part 82b at the upper end of bolt 82a, and a disc-shaped stopper 82c in the mid section of bolt 82.

Bolt 82a penetrates a collar 83 made of rubber and is mounted in bottom wall 44 from the inside to the outside of fuel tank 2. A nut 84 is tightened to the underside of bottom wall 44 so that stopper 82c comes in touch with bottom wall 44 and the upper side of collar 83. The area on fuel tank 2 penetrated by bolt 82a is kept liquid-tight since stopper 82c is firmly attached to bottom wall 44 and collar 83 by tightening nut 84.

Umbrella part 82b has a circular disc area 82d joined to the upper end of bolt 82a, and a tapered area 82e, the outer diameter of which is gradually increased toward the lower end starting from the outer periphery of circular disc area 82d. Umbrella member 82 is installed to fuel tank 2 by initially inserting umbrella member 82 into fuel tank 2 through filler opening 41, and inserting bolt 82a of umbrella member 82 through collar 83.

Then, bolt 82a is pressed into collar 83 until stopper 82c abuts bottom wall 44, and nut 84 is tightened to bolt 82a on the underside of bottom wall 44. Installation of umbrella member 82 is completed by tightening nut 84. Use of umbrella member 82 formed separately from fuel tank 2 gives the same effect as the embodiments of FIGS. 1-9.

The particular embodiments of the invention described herein should be considered illustrative, rather than restrictive. Modification to the described embodiments may be made without departing from the spirit of the invention as defined by the following claims.

The invention claimed is:

1. A motorcycle comprising:
    a fuel tank having a filler opening formed in a transversal center of the fuel tank with an upward opening, wherein
    a projecting part projecting toward the filler opening is provided on a bottom wall of the fuel tank opposite to the filler opening, and
    the projecting part includes inclined planes formed between a projection tip and the bottom wall.

2. The motorcycle according to claim 1, wherein the inclined planes include an inclined plane descending toward a left side of the motorcycle, and an inclined plane descending toward a right side of the motorcycle.

3. The motorcycle according to claim 1, wherein the inclined planes include an inclined plane facing a rear of the motorcycle.

4. The motorcycle according to claim 1, wherein the projecting part is formed in a shape of a roof.

5. The motorcycle according to claim 1, further comprising:
    an air cleaner having a top face inclined downward toward a rear of the motorcycle, wherein
    the filler opening is disposed above the air cleaner, and
    the bottom wall of the fuel tank is downwardly inclined toward the rear along the top face of the air cleaner.

6. The motorcycle according to claim 1, further comprising:
    a body frame having right and left frame members, wherein
    the fuel tank is disposed between the frame members, and
    the projecting part is provided in a transversal center between the frame members.

7. The motorcycle according to claim 6, and further comprising:
    an air cleaner disposed below the fuel tank, the air cleaner including an air cleaner element, an air cleaner box for supporting the air cleaner element, and a mounting member for mounting the air cleaner element to the air cleaner box, wherein
    the projecting part opens downward, and
    a head of the mounting member faces an inside of the opening of the projecting part.

8. The motorcycle according to claim 1, wherein the projecting part is integrally formed with the bottom wall of the fuel tank.

9. A motorcycle comprising:
a fuel tank having a filler opening formed in a transversal center of the fuel tank with an upward opening, wherein
a projecting part projecting toward the filler opening is provided on a bottom wall of the fuel tank opposite to the filler opening, and
the projecting part is formed in a shape of a triangular pyramid.

10. The motorcycle according to claim 9, wherein a projection tip of the pyramid is positioned on an extension of an axial line of the filler opening.

11. A motorcycle comprising:
a fuel tank having a filler opening formed in a transversal center of the fuel tank with an upward opening, wherein
a projecting part projecting toward the filler opening is provided on a bottom wall of the fuel tank opposite to the filler opening, and
the projecting part is formed in a shape of a tetragonal pyramid.

12. A motorcycle comprising:
a fuel tank having a filler opening formed in a transversal center of the fuel tank with an upward opening, wherein
a projecting part projecting toward the filler opening is provided on a bottom wall of the fuel tank opposite to the filler opening, and
the projecting part is formed in a shape of a hemisphere.

13. A motorcycle comprising:
a fuel tank having a filler opening formed in a transversal center of the fuel tank with an upward opening, wherein
a projecting part projecting toward the filler opening is provided on a bottom wall of the fuel tank opposite to the filler opening, and
the projecting part is formed separately from the bottom wall of the fuel tank.

14. The motorcycle according to claim 13, wherein the projecting part comprises a bolt penetrating the bottom wall of the fuel tank and an umbrella part provided at an upper end of the bolt.

15. The motorcycle according to claim 14, wherein the umbrella part comprises a circular disc area at the upper end of the bolt, and a tapered area having an outer diameter that is gradually increased toward a lower end starting from an outer periphery of the circular disc area.

16. A motorcycle comprising:
a fuel tank having a filler opening formed in a transversal center of the fuel tank with an upward opening, wherein
a projecting part projecting toward the filler opening is provided on a bottom wall of the fuel tank opposite to the filler opening, and
the projecting part includes inclined planes that extend from the bottom wall and meet to form a ridge line.

* * * * *